Nov. 23, 1926.
P. PARKE ET AL
1,608,228
METAL AUTOMOBILE BODY
Filed Jan. 14, 1924     6 Sheets-Sheet 1
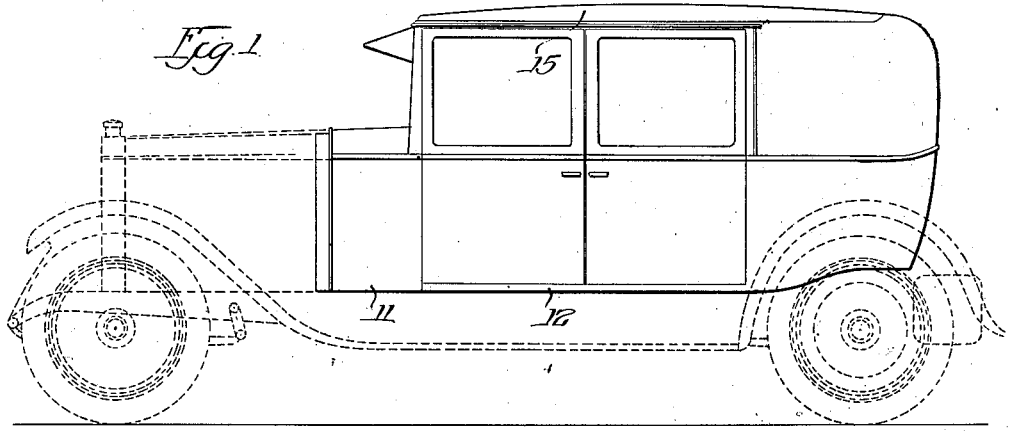
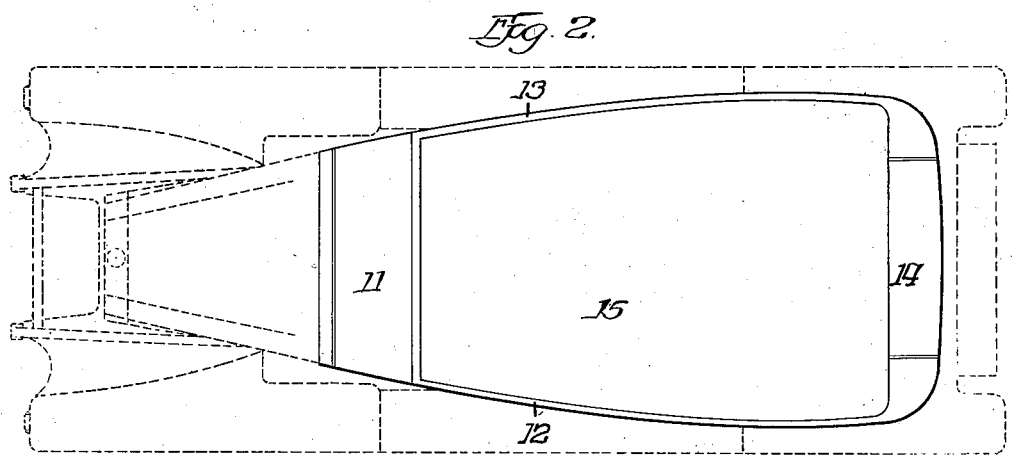
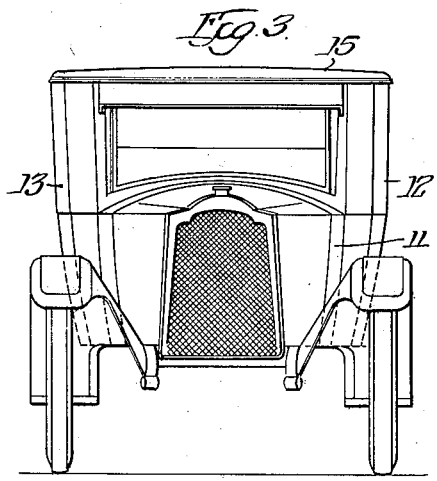
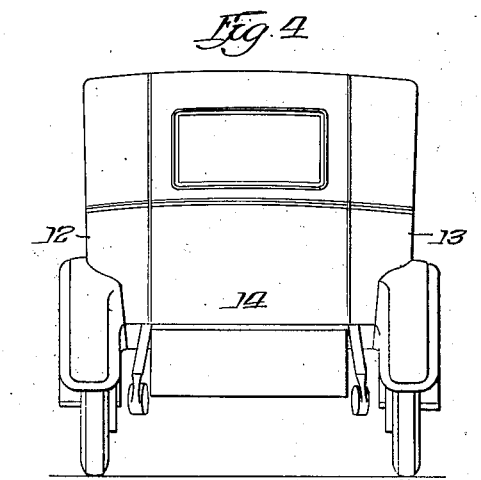
Inventors
Peter Parke
Carl Apel
Joseph Brack
By Cromwell Greist & Warden

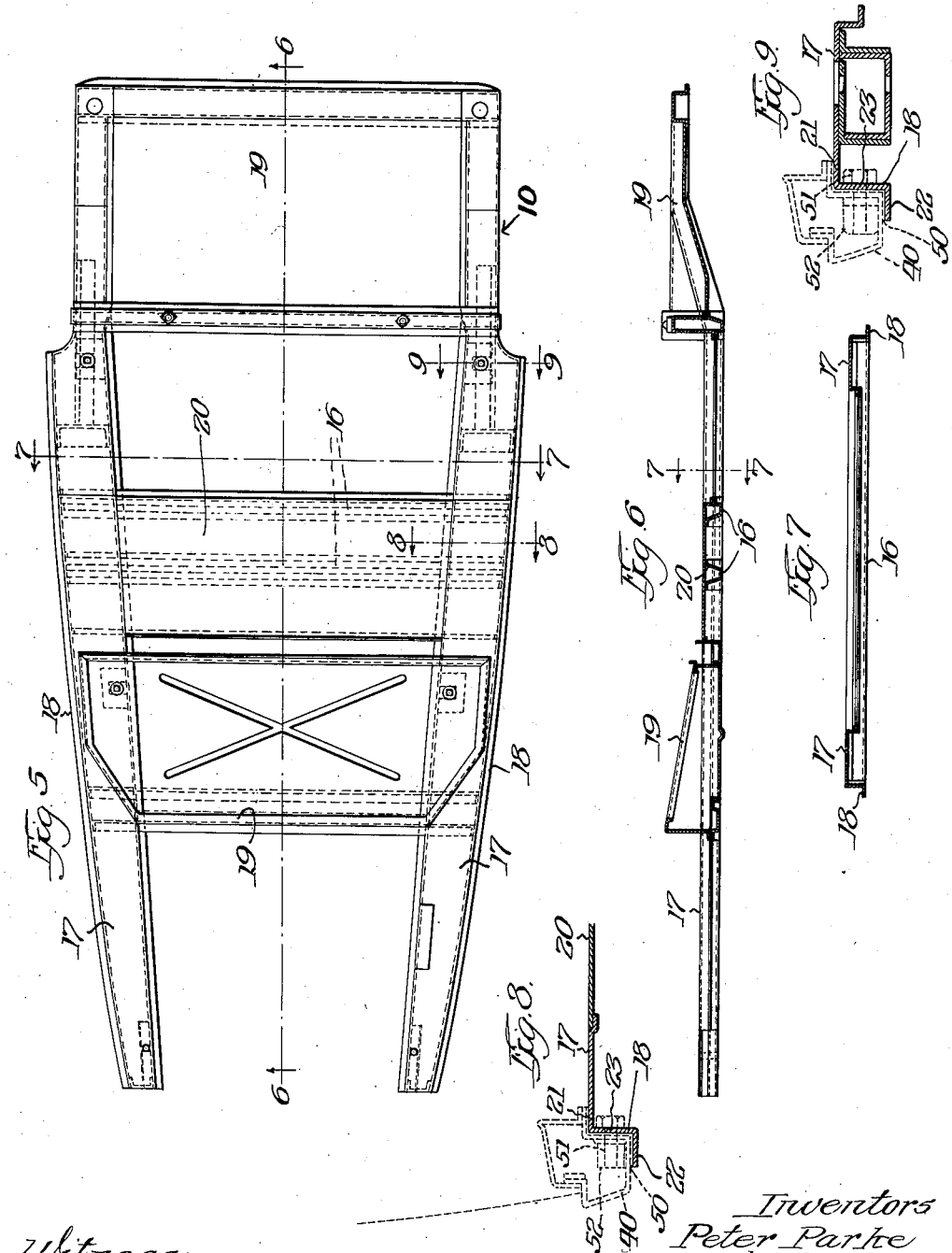

Nov. 23, 1926.
P. PARKE ET AL
1,608,228
METAL AUTOMOBILE BODY
Filed Jan. 14, 1924     6 Sheets-Sheet 3
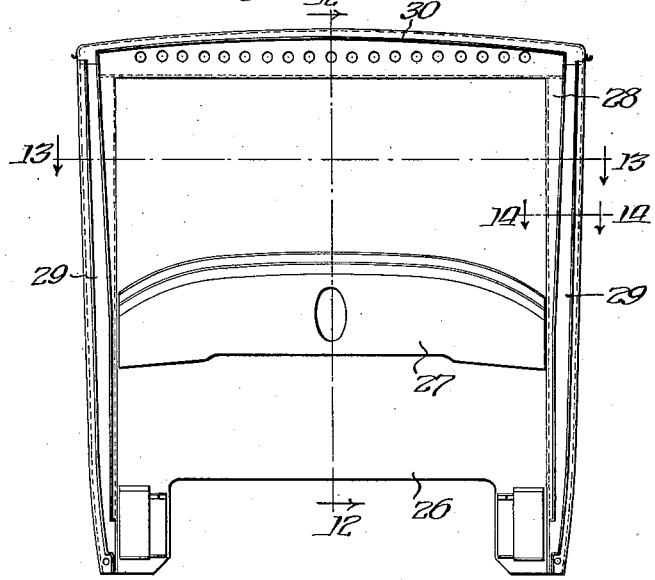
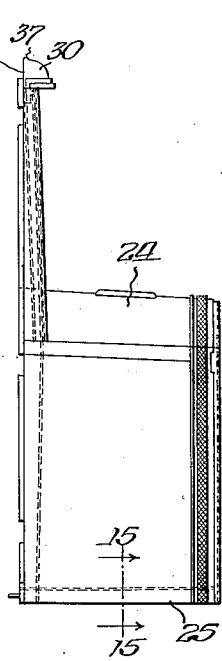
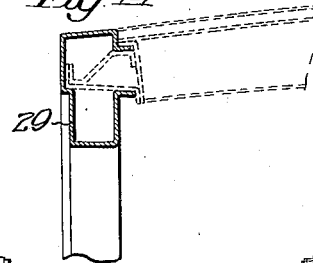
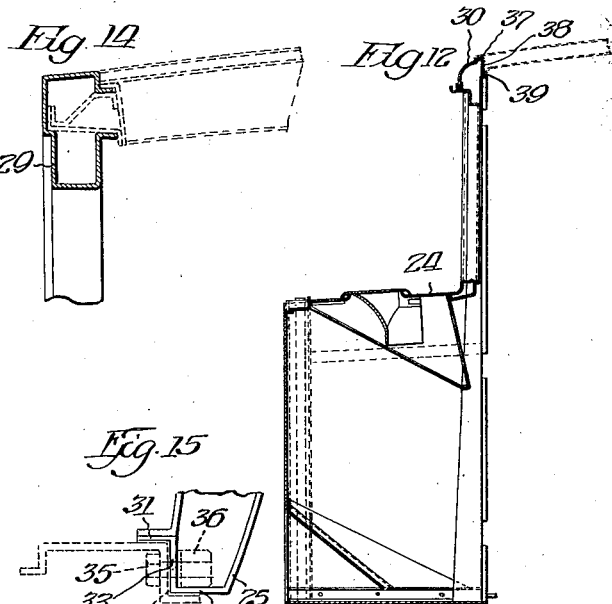
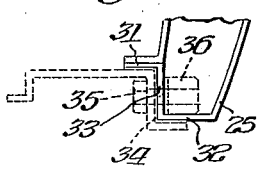
Inventors
Peter Parke
Carl Apel
Joseph Brack

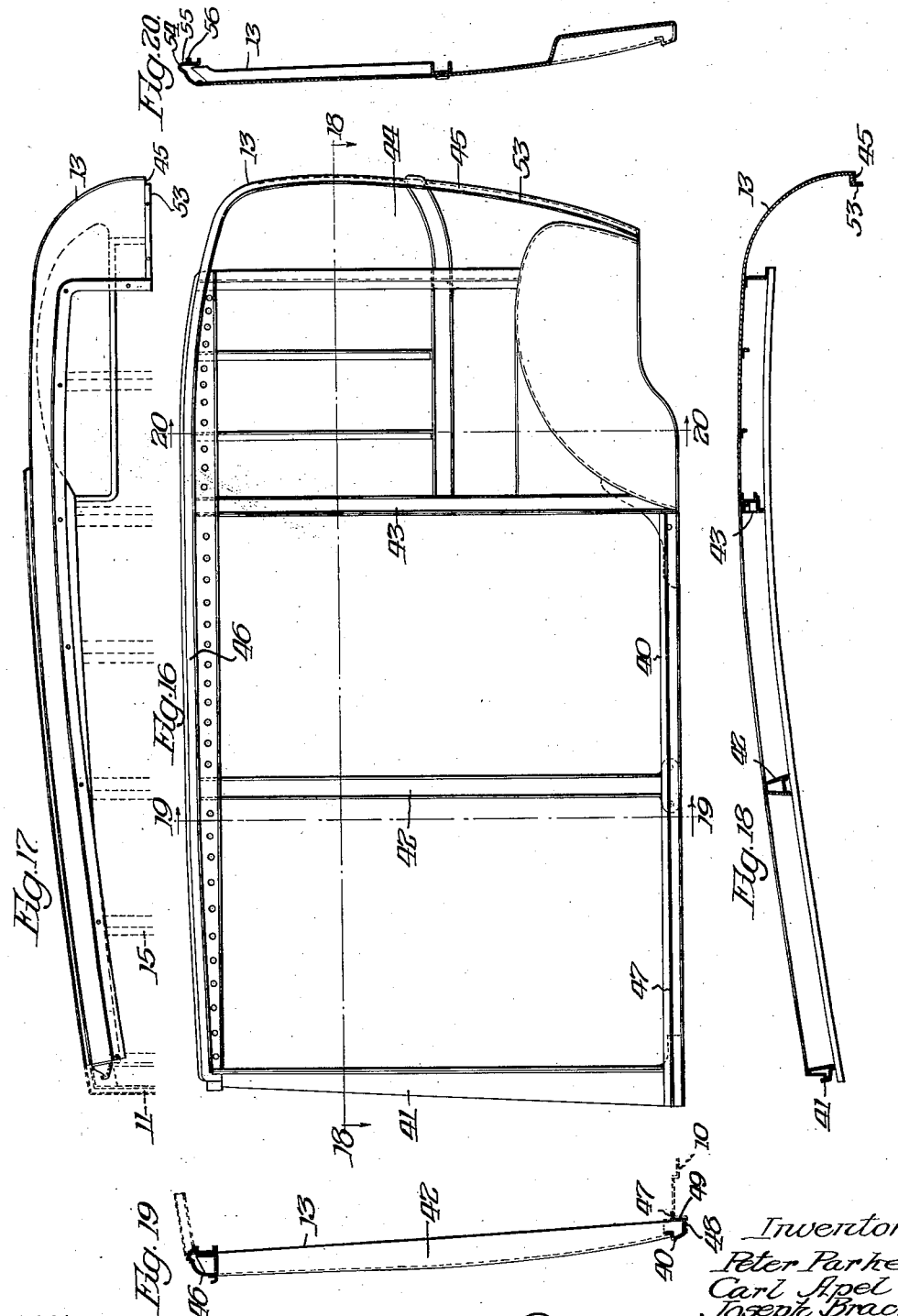

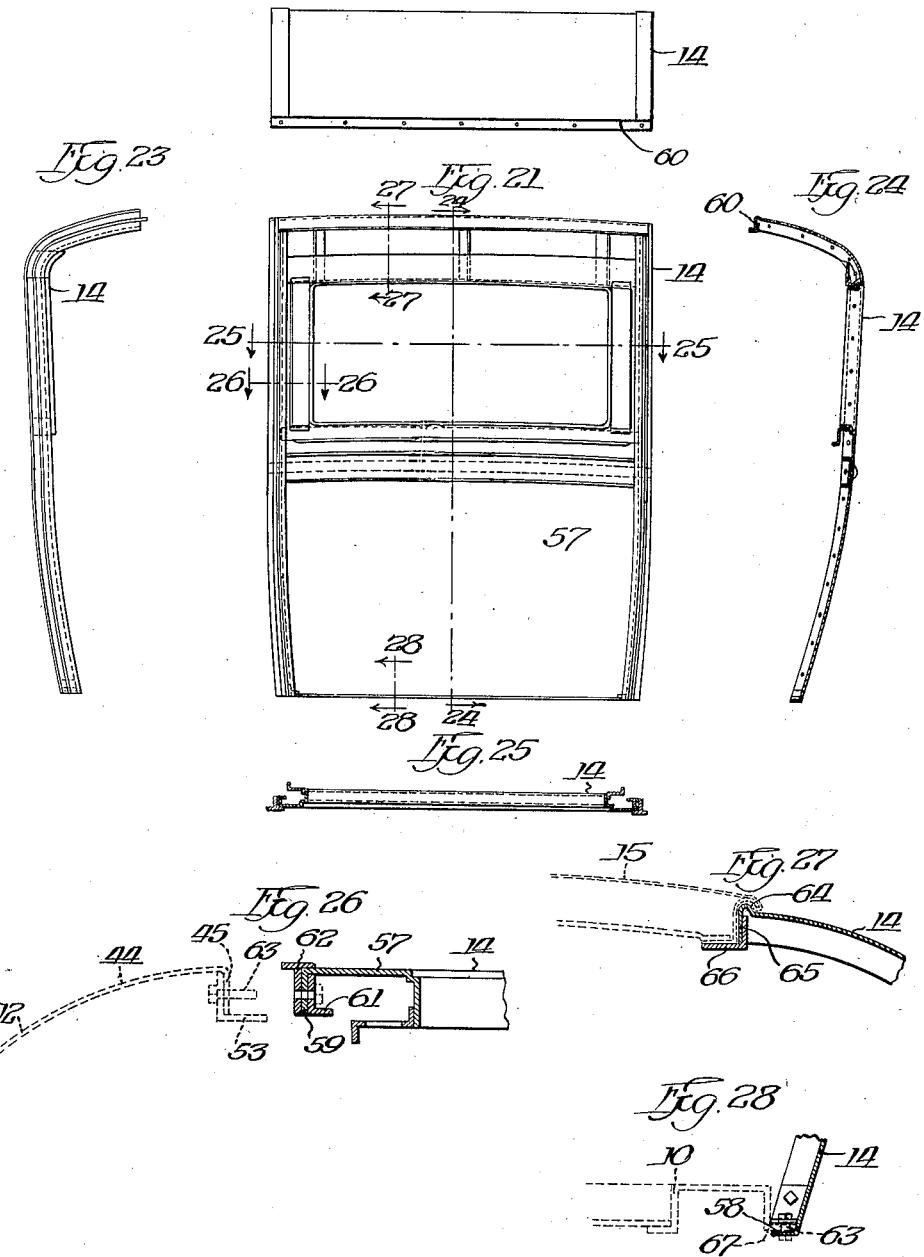

Nov. 23, 1926. 1,608,228
P. PARKE ET AL
METAL AUTOMOBILE BODY
Filed Jan. 14, 1924  6 Sheets-Sheet 6
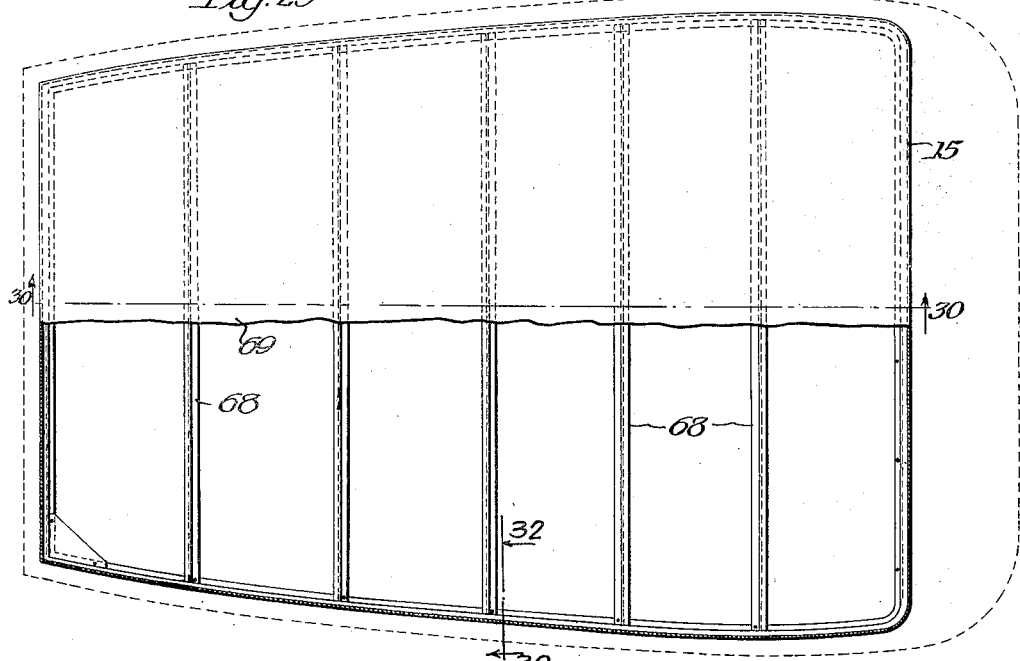
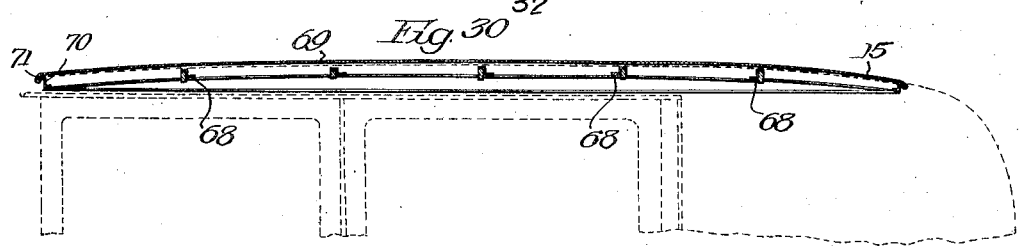
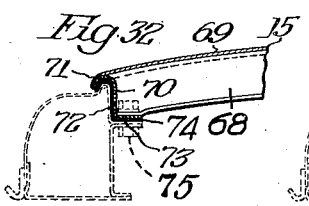 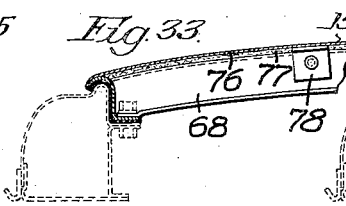 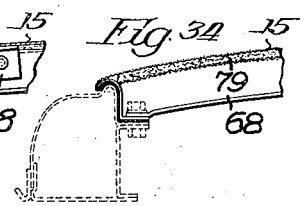
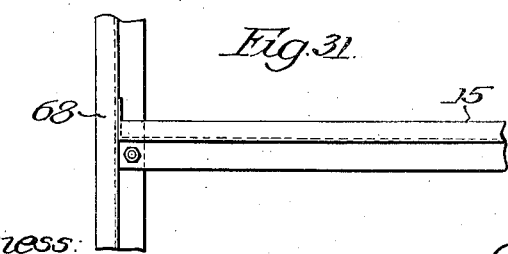
Inventors:
Peter Parke
Carl Apel
Joseph Brack Patented Nov. 23, 1926.

1,608,228

UNITED STATES PATENT OFFICE.

PETER PARKE, CARL APEL, AND JOSEPH BRACK, OF CHICAGO, ILLINOIS, ASSIGNORS TO THE PULLMAN COMPANY, OF CHICAGO, ILLINOIS, A CORPORATION OF ILLINOIS.

METAL AUTOMOBILE BODY.

Application filed January 14, 1924. Serial No. 685,955.

The principal object of the invention is to provide a closed automobile body of all-metal construction.

Another important object of the invention is to provide a closed automobile body which is composed of separate marginally secured sections of all-metal construction.

Another object is to provide such a sectional body wherein each section is an integral structure which embodies within its limits all of the frame-work and sheathing essential to the body within such limits.

Another object is to provide such a sectional body wherein each section is so constructed about its marginal attaching portions as to permit exteriorly invisible connections which will withstand indefinitely the most severe racking strains incident to heavy duty use.

Another object is to provide such a sectional body wherein each section is of such size as to permit compact arrangement of the sections for shipping in a knock-down form ready for assembling, easy replacement of one or more of the sections when seriously or irreparably damaged, high-temperature oven-baked enameling of the exposed sections, and economical construction of the sections on individual jigs.

Other objects and advantages which are not specifically referred to in this disclosure will be appreciated upon a full comprehension of the construction, and manner of assemblage of the sections of the body.

For the purpose of exemplification, one embodiment of the invention is presented in the accompanying drawings and in the following detailed description, but, as numerous other modified embodiments are obviously also within the purview of the invention, the particular embodiment here presented is not to be considered as limiting the spirit of the invention short of its intended scope as defined by the appended claims.

In the drawings—

Fig. 1 is a side view of an automobile body embodying the invention, showing in dotted lines the associated vehicle parts;

Fig. 2 is a top view of the body, also showing in dotted lines the associated vehicle parts;

Fig. 3 is a front view of the body, showing in full lines the associated vehicle parts;

Fig. 4 is a rear view of the body, also showing in full lines the associated vehicle parts;

Fig. 5 is a top view of the bottom section of the body;

Fig. 6 is a longitudinal section through the same on the line 6—6 of Fig. 5;

Fig. 7 is a transverse section through the same on the line 7—7 of Fig. 5;

Fig. 8 is a transverse section through the same on the line 8—8 of Fig. 5, showing in dotted lines the connection with one of the two side sections of the body;

Fig. 9 is a transverse section through the same on the line 9—9 of Fig. 5, showing in dotted lines the connection with one of the two side sections of the body;

Fig. 10 is an inside view of the front section of the body;

Fig. 11 is a side view of the same;

Fig. 12 is a vertical section through the same on the line 12—12 of Fig. 10, showing in dotted lines the connection with the top section of the body;

Fig. 13 is a horizontal section through the same on the line 13—13 of Fig. 10;

Fig. 14 is a horizontal section through the same on the line 14—14 of Fig. 10, showing in dotted lines the connection with one of the two side sections of the body;

Fig. 15 is a vertical section through the same on the line 15—15 of Fig. 11, showing in dotted lines the connection with the bottom section of the body;

Fig. 16 is an inside view of one of the two side sections of the body;

Fig. 17 is a top view of the same, showing in dotted lines the relative positions of the front and top sections of the body;

Fig. 18 is a horizontal section through the same on the line 18—18 of Fig. 16;

Fig. 19 is a vertical section through the same on the line 19—19 of Fig. 16, showing in dotted lines the connections with the top and bottom sections;

Fig. 20 is a vertical section through the same on the line 20—20 of Fig. 16;

Fig. 21 is an inside view of the rear section of the body.

Fig. 22 is a top view of the same;

Fig. 23 is a side view of the same;

Fig. 24 is a vertical section through the same on the line 24—24 of Fig. 21;

Fig. 25 is a horizontal section through the same on the line 25—25 of Fig. 21;

Fig. 26 is a horizontal section through the same on the line 26—26 of Fig. 21, showing in dotted lines the connection with one of the two side sections of the body;

Fig. 27 is a vertical section through the same on the line 27—27 of Fig. 21, showing in dotted lines the connection with the top section of the body;

Fig. 28 is a vertical section through the same on the line 28—28 of Fig. 21, showing in dotted lines the connection with the bottom section of the body;

Fig. 29 is a top view of the top section of the body with a portion of the cover sheet broken away to expose the interior construction, showing in dotted lines the relative positions of the front, side, and rear sections of the body;

Fig. 30 is a vertical section through the same on the line 30—30 of Fig. 29, showing in dotted lines the relative position of one of the side sections of the body;

Fig. 31 is a fragmentary top view of the interior construction of the same;

Fig. 32 is a vertical section through the same on the line 32—32 of Fig. 29, showing in dotted lines the connection with one of the side sections of the body;

Fig. 33 is a similar view illustrating a modified construction of the top section of the body; and Fig. 34 is a similar view illustrating another modified construction of the top section of the body.

It will be observed in the drawings that the automobile body of the invention is composed of a bottom section 10, a front section 11, a left side section 12, a right side section 13, a rear section 14 and a top section 15. The sections are separate integral structures which embody within their limits all of the reinforcing frame-work, exterior sheathing, and the like, essential to the body within such corresponding limits. The body is produced in complete form by merely assembling and securing the sections in proper relation, and, as thus associated, the sections are maintained rigidly in interlocked relation and the normally exposed sheathing on the sections is caused to conform throughout, in its apparent continuity and its composite contour, to the ordinary built-up body of similar design.

The bottom section 10 of the body—illustrated in Figs. 5 to 9 inclusive—is an integral all-metal structure. The section includes a number of transversely extending beams 16 which form the main support for the body on the chassis of the vehicle and are adapted to be bolted or otherwise secured intermediate their ends to the chassis; two longitudinally extending beams 17 which are supported on the ends of the beams 16, two sills 18 formed on the beams 17 for supporting the front and side sections of the body, two seat frames 19 which are supported on the beams 17, and a suitably disposed floor web 20 which is supported on the beams 16 and 17.

The sills 18, which constitute probably the most salient structural feature of the bottom section, extend along the beams 17 from the front ends of the same to points corresponding to the locations of the front portions of the usual wheel housings, where the sills terminate and the beams continue in accordingly modified form. The sills diverge rearwardly in conformation with the shape of the body, and are provided with horizontal ledges 21 and 22 for receiving the vertical loads on super-positioned sections and intermediate vertical webs 23 for both receiving the side stresses of the super-positioned sections and accommodating the attaching bolts or other securing means. The portions of the front and side sections adapted for association with the sills of the bottom section will be hereinafter described in connection with such other sections.

The front section 11 of the body—illustrated in Figs. 10 to 15 inclusive—is, like the previously described section, an integral all-metal structure. The section includes a cowl 24, two supporting shoes 25 along the bottom portions of the cowl, a dash board 26, an instrument board 27, a windshield frame 28, two attaching posts 29 on the rear portions of the cowl and the windshield frame, and a cap-rail 30 across the top portion of the windshield frame. The supporting shoes 25, the attaching posts 29 and the cap-rail 30 are adapted for respective association with marginal portions of the bottom, side and top sections. The shoes 25 diverge rearwardly with the sides of the cowl, and are provided on their inner and under faces with offset horizontal ledges 31 and 32 adapted to seat against the corresponding ledges 21 and 22 on the sills 18 of the bottom section, and interposed vertical webs 33 adapted to seat against the corresponding webs 23 on the sills 18. A lining strip 34 of suitable deadening material is preferably inserted between the shoes 25 and the sills 18 when the same are brought into association in assembling the sections of the body, and a number of attaching bolts 35 are passed through corresponding apertures in the vertical webs of the sills and shoes and drawn up into suitably mounted screw bosses 36. The attaching posts 29 form the sides of the windshield frame, and are hollow on their rear faces to receive telescopically the hereinafter described front portions of the side sections. The cap-rail 30 forms the top of the windshield frame, and is provided across its top with a bead 37, a vertical web 38 depending from the bead and a horizontal ledge 39 extending from the web, which configuration is adapted to support the hereinafter described front portion of the top section.

The left side section 12 of the body and the right side section 13 of the body are in all material respects identical, and a description of the right side section—illustrated in Figs. 16 to 20 inclusive—will accordingly suffice. The section is, like the previously described sections, an integral all-metal structure. The section includes a supporting shoe 40 along the bottom of the same, a front door post 41 which extends upwardly from the front end of the shoe 40, an intermediate door post 42 which extends upwardly from the middle of the shoe, a rear door post 43 which extends upwardly from the rear end of the shoe, an interiorly reinforced wall portion 44 which extends rearwardly from the rear door post and follows around the corner curve of the body, an attaching flange 45 along the rear end of the wall portion 44, and a cap-rail 46 which is mounted over the tops of the three spaced door posts and extends first rearwardly along the top portion of the wall portion 44 and then around the corner curve of the body to the top of the attaching flange 45. The wall portion 44 may be exteriorly ornamented with a diagonally extending bow support, or may contain a window, depending entirely upon the style of body desired.

The supporting shoe 40, the front door post 41, the rear attaching flange 45 and the cap-rail 46 are adapted for respective association with marginal portions of the bottom, front, rear and top sections. The supporting shoe 40 is provided, like the right side supporting shoe 25 of the front section, with offset horizontal ledges 47 and 48 and an interposed vertical web 49, which configuration is, like that of the shoe 25, adapted to seat against the corresponding ledges 21 and 22 and web 23 on the right side sill 18 of the bottom section. The front door post 41 is adapted to be telescopically received within the right side post 29 of the front section, and is for such purpose shaped to conform snugly with certain interior portions of the post 29. A lining strip 50 is preferably inserted between the shoe 40 and the sill 18 when the right side section is brought into association with the already associated bottom and front sections, and a number of bolts 51 are passed through corresponding apertures in certain contacting areas of the posts and in the vertical webs of the shoe and sill and drawn up into suitably mounted screw bosses 52. The rear attaching flange 45 is bent forwardly from the rear end of the right side section, and has secured thereto in the manner shown an angle bar 53 which is of service as hereinafter described in securing to the section the adjacent margin of the rear section. The cap-rail 46 is provided, like the cap-rail 30 of the front portion, with a bead 54, a vertical web 55 depending from the bead and a horizontal ledge 56 extending from the web, which configuration is, like that of the cap-rail 30, adapted to support one of the hereinafter described side portions of the top section.

The rear section 14 of the body—illustrated in Figs. 21 to 28 inclusive—is, like the previously described sections, an integral all-metal structure. The section includes an interiorly reinforced wall portion 57 which curves forwardly adjacent its top and bottom, an attaching flange 58 across the bottom of the same, two attaching flanges 59 along the sides of the same, and a cap-rail 60 across the top of the same.

The attaching flanges 59 and the cap-rail 60 are adapted for respective association with marginal portions of the side and top sections. The attaching flanges 59 have secured thereto in the manner shown angle bars 61 and T bars 62. The outer sides of the heads of the T-bars overlie contiguously the adjacent faces of the wall portion 57, and the inner sides of the heads of the T bars are adapted to overlie similarly the corresponding faces of the side sections when the rear section is brought into association with the already associated bottom and side sections. The angle bars 61 on the rear section and the angle bars 53 on the side sections are of service in securing such sections together in that they may be clamped together while holes are drilled through the flanges 45 and 59 and until bolts 63 are inserted and drawn up. The cap-rail 60 is provided, like the cap-rails of the front and side sections, with a bead 64, a vertical web 65 depending from the bead, and a horizontal ledge 66 extending from the web, which configuration is, like that of the other cap-rails, adapted to support the hereinafter described rear portion of the top section. The attaching flange 58 across the bottom of the rear section is merely adapted to be lapped under and secured with a flange 67 across the rear end of the bottom section.

The top section 15 of the body—illustrated in Figs. 29 to 34 inclusive—is an integral all-metal or part-metal structure. The section includes a frame 68, a cover 69 and a marginal cap configuration 70. The cap configuration 70 is adapted for interfitting association with the cap-rails on the tops of the front, side and rear sections. The cap configuration 70 extends about the periphery of the section, and consists of a downwardly curved flange 71 adapted to wedge snugly down over both sides of the beads of the cap-rails, a vertical web 72 adapted to abut against the vertical webs of the cap-rails, and a horizontal ledge 73 adapted to seat upon the horizontal ledges of the cap-rails. Lining strips 74 are preferably inserted between the configuration 70 and the cap-rails when the same are brought into association in assembling the sections of the body, and a number of attaching bolts 75 are passed through corresponding apertures in the horizontal ledges and drawn up.

If an all-metal top section 15 is desirable, the cover 69 may be attached directly to the frame 68, as by welding, and turned in under the flange 71, as shown in Fig. 32; if an all-metal top section having an aluminum cover 76 is desirable, the cover may be attached to the frame 68 over a deadening lining 77 by means of intermediate angle clips 78, as shown in Fig. 33; and, if a part-metal top section having a fabric or composition cover 79 is desirable, the cover may be stretched over the frame 68, as shown in Fig. 34.

The marginal attaching configurations provided on the sections of the body cooperate to produce an exceedingly rigid and weatherproof body wherein is combined, with the pleasing unitary appearance characteristic of the integrally built-up body, the many additional advantages of sectional construction.

We claim:

1. A closed automobile body composed of separate marginally secured bottom, front, left side, right side, rear and top sections; said front section integrally embodying a cowl, a dash board, an instrument board and a windshield frame, and being provided, along the bottom marginal portions of the cowl, with spaced supporting shoes adapted to be secured to the front portion of the bottom section, and, along the rear ends of the cowl and the sides of the windshield frame, with spaced rearwardly opening channels adapted to receive the front marginal portions of the side sections.

2. A closed automobile body composed of separate marginally secured bottom, front, left side, right side, rear and top sections; said front section integrally embodying a cowl, a dash board, an instrument board and a windshield frame, and being provided, along the bottom marginal portions of the cowl, with spaced supporting shoes adapted to be secured to the front portion of the bottom section, along the rear ends of the cowl and the sides of the windshield frame, with spaced rearwardly opening channels adapted to receive the front marginal portions of the side sections, and, across the top of the windshield frame, with a cap-rail adapted to support the front marginal portion of the top section.

3. A closed automobile body composed of separate marginally secured bottom, front, left side, right side, rear and top sections; each of said side sections having a supporting shoe adapted to be secured to a marginal portion of the bottom section, an upright door post secured at its lower end to the shoe and adapted to be received within a recessed marginal portion of the front section, and a cap-rail secured to the upper end of the post and adapted to support a marginal portion of the top section.

4. A closed automobile body composed of separate marginally secured bottom, front, left side, right side, rear and top sections; each of said side sections having a Z-shaped shoe adapted to be secured to a correspondingly shaped portion on the bottom section, an upright door post secured at its lower end to the front end of the shoe and adapted to be inserted within a conforming recess in the rear portion of the front section, and a cap-rail mounted at its front end on the upper end of the post and adapted to support a marginal portion of the top section.

5. A closed automobile body composed of separate marginally secured bottom, front, left side, right side, rear and top sections; said front, side and rear sections being provided about their top margins with cap-rails, and said top section being provided about its margin with a correspondingly shaped configuration adapted to fit down over the cap-rails in interlocked relation with the same.

6. A closed automobile body composed of separate marginally secured bottom, front, left side, right side, rear and top sections; said front, side and rear sections being provided about their top margins with similar cap-rails having a top bead, a vertical web depending from the bead and a horizontal ledge extending from the web, and said top section being provided about its margin with a correspondingly shaped configuration adapted to fit down over the cap-rails in laterally interlocked relation with the same.

7. A closed automobile body composed of separate marginally secured bottom, front, left side, right side, rear and top sections; said front section integrally embodying a cowl and a windshield frame, and being provided along the bottom marginal portions of the cowl with spaced horizontal supporting shoes adapted to be secured to the front portion of the bottom section, and, along the rear ends of the cowl and the sides of the windshield frame, with spaced rear marginal portions shaped to interlock laterally with the front marginal portions of the side sections.

8. In a closed metal automobile body of sectional construction, an integral side section having an inturned rear marginal portion which includes the entire rear bend in the body and terminates in a rear edge which curves forwardly from a substantially vertical position at the rear of the body to a substantially horizontal position at the top of the rear of the body.

9. In a closed metal automobile body of sectional construction, an integral side section having an inturned rear marginal portion which includes the entire rear bend in the body and terminates in a forwardly flanged rear edge which curves forwardly in a substantial vertical plane from a substantially vertical position at the rear of the body to a substantially horizontal position at the top of the rear of the body.

In testimony whereof we have hereunto signed our names.

PETER PARKE.
CARL APEL.
JOSEPH BRACK.